UNITED STATES PATENT OFFICE.

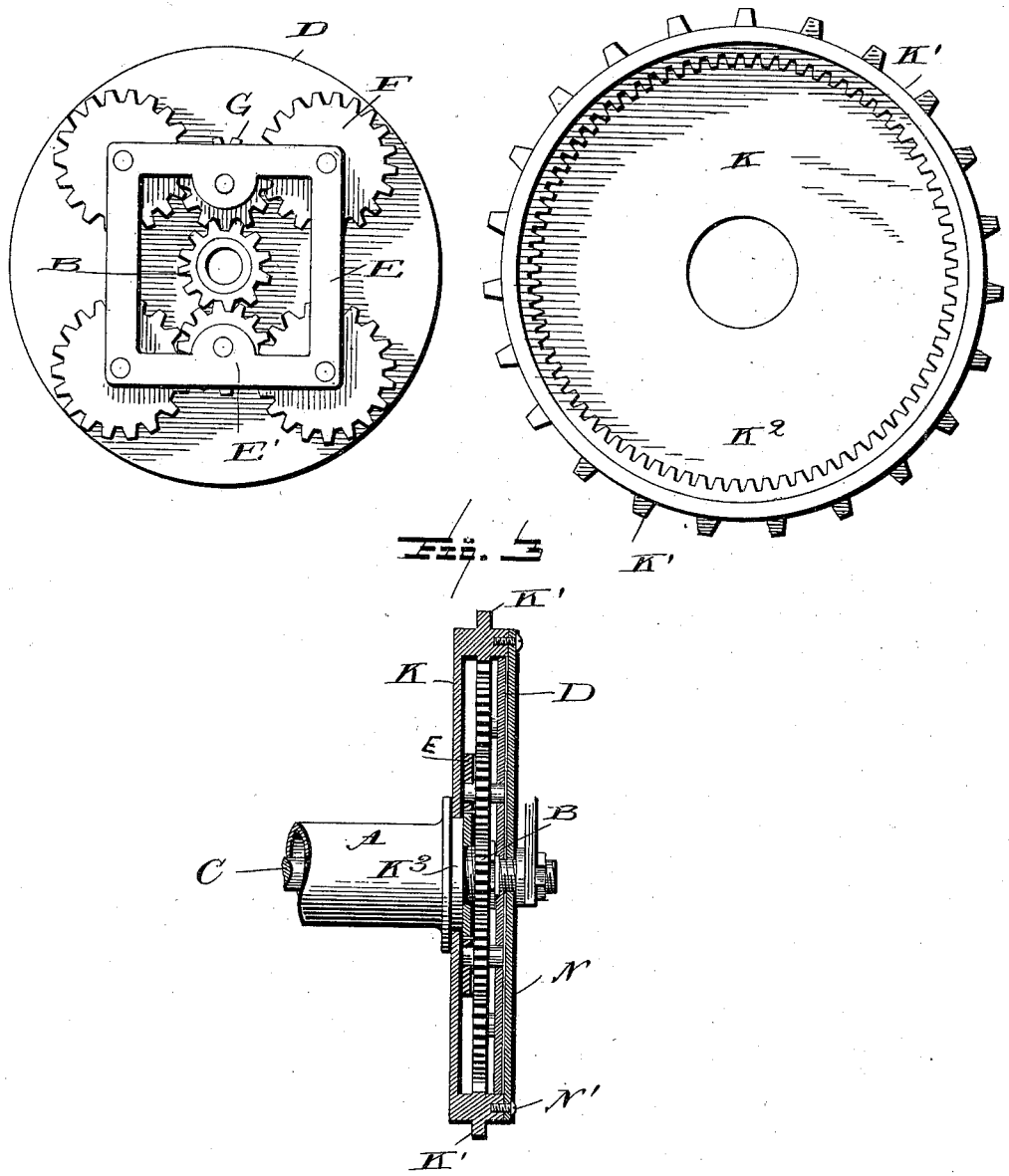

JAMES J. STAFFORD, OF ROCHESTER, NEW YORK.

BICYCLE PROPULSION.

SPECIFICATION forming part of Letters Patent No. 625,906, dated May 30, 1899.

Application filed January 14, 1899. Serial No. 702,175. (No model.)

*To all whom it may concern:*

Be it known that I, JAMES J. STAFFORD, a citizen of the United States, residing at Rochester, in the county of Monroe and State of New York, have invented certain new and useful Improvements in Bicycle Propulsion; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in bicycle propulsion, and especially to mechanism whereby power is imparted from an internally-toothed sprocket-wheel, which is made to rotate by means of the chain in the usual manner, said sprocket-wheel being adapted to impart a power through a series of intermeshing cogs carried by a disk mounted stationary on the rear axle of a bicycle-wheel.

To these ends and to such others as the invention may pertain the same consists, further, in the novel construction, combination, and adaptation of parts, as will be hereinafter more fully described and then specifically defined in the appended claim.

My invention is clearly illustrated in the accompanying drawings, which, with the letters of reference marked thereon, form a part of this application, and in which drawings—

Figure 1 is an elevation of the sprocket-wheel shown as secured to the rear hub of a wheel with a portion of the disk secured to the axle removed, so as to show the intermeshing of the wheels which transfer the power from the sprocket-wheel to the hub. Fig. 2 is a side elevation of the sprocket-wheel, showing the geared wheels removed therefrom; and Fig. 3 is a vertical central sectional view through the sprocket-wheel and geared mechanism.

Reference now being had to the details of the drawings by letter, A designates the hub of the rear wheel of a bicycle, which has keyed or fastened thereto a cog-wheel B, and said hub and wheel revolves on the axle C, suitable bearings of any kind being interposed between the hub and the axle, but which bearings are not shown in the drawings, as they form no part of the present invention. Mounted in a fixed position on the axle C is the disk D, and secured to said disk is a frame E, between which frame and disk D are mounted, in the corners thereof, the geared wheels F, which are designed to mesh with geared wheels G, mounted on the ears E' of the frame E. These gear-wheels G are adapted to mesh with the geared wheel B, which is secured to and rotates with the hub. Mounted on the hub is a casing K, which has about its circumference sprocket-teeth K' and an internal circular series of cog-teeth $K^2$. This casing has a bearing at $K^3$ on the hub of the wheel and is fitted over a shouldered portion of the hub when applied to the latter and is held in place by means of a collar M. When the parts are adjusted in position, the teeth in the wheels F are designed to mesh with the teeth $K^2$ on the inner periphery of the sprocket-casing.

N is a disk which incloses the geared mechanism and is secured to the casing K by means of screws N', and, if desired, suitable packing-strips, which are not shown, may be interposed between the said disk N and the disk D to prevent dust from getting into the mechanism.

In operation it will be noted that as the sprocket-chain, which is not shown, but which is designed to transmit power to the sprocket-wheel on the rear hub of the bicycle, causes the sprocket-casing to rotate about the hub the teeth of the wheels F, meshing with the teeth $K^2$ on the inner periphery of the sprocket-casing, will cause motion to be transmitted from the sprocket-casing to the hub through the geared connections described, this being rendered possible by reason of the fact that the frame carrying the geared wheels is held stationary with the axle.

As a result of the experiments tried on a bicycle equipped with my improved propulsion device, I find that I am able to produce a powerful action on the rear wheel and at the same time lessen the power necessary to drive the wheel, besides increasing the speed with less motion and with a minimum effort, and by increasing the gear to a certain height, which may be determined, the power necessary to drive the wheel is diminished in proportion to the increased gear.

Having thus described my invention, what I claim to be new, and desire to secure by Letters Patent, is—

A propulsion device for bicycles, comprising in combination the fixed axle, the stationary disk D secured thereto, the hub having an enlarged shouldered portion K³, the sprocket-disk K, with central aperture fitted to rotate on said shouldered portion and bearing against a rim thereon, the inner circumference of the sprocket-rim of disk K rotating about and adjacent to the circumference of disk D, the apertured disk N secured to the sprocket-rim of disk K, and having a bearing at its center on the axle, the square frame E and pivots, carried by said disk D, on which the frame is mounted, the gear-wheel B mounted to turn with the hub, the geared wheels F journaled on the pivots at the corners of said frame and meshing with teeth on the inner circumference of the sprocket-rim, the gear-wheels G meshing with wheels F and B, all as shown and described.

In testimony whereof I affix my signature in presence of two witnesses.

JAMES J. STAFFORD.

Witnesses:
MYRON T. BLY,
ANNA E. SHANNON.